(12) United States Patent
Chen et al.

(10) Patent No.: US 11,566,706 B2
(45) Date of Patent: Jan. 31, 2023

(54) SHIFT DRIVE

(71) Applicant: Ficosa International (Taicang) Co. Ltd., Jiangsu (CN)

(72) Inventors: Qiang Chen, Jiangsu (CN); Santiago Gimeno Grane, Jiangsu (CN)

(73) Assignee: FICOSA INTERNATIONAL (TAICANG) CO. LTD., Jiangsu (CN)

( * ) Notice: Subject to any disclaimer, the term of this patent is extended or adjusted under 35 U.S.C. 154(b) by 0 days.

(21) Appl. No.: 17/043,246

(22) PCT Filed: Mar. 28, 2019

(86) PCT No.: PCT/CN2019/079999
§ 371 (c)(1),
(2) Date: Sep. 29, 2020

(87) PCT Pub. No.: WO2019/184964
PCT Pub. Date: Oct. 3, 2019

(65) Prior Publication Data
US 2021/0025493 A1 Jan. 28, 2021

(30) Foreign Application Priority Data

Mar. 30, 2018 (CN) .......................... 201810295940.6

(51) Int. Cl.
*F16H 63/00* (2006.01)
*F16H 63/30* (2006.01)
(Continued)

(52) U.S. Cl.
CPC ........... *F16H 63/304* (2013.01); *F16H 57/02* (2013.01); *F16H 61/32* (2013.01);
(Continued)

(58) Field of Classification Search
CPC ........ F16H 63/304; F16H 57/02; F16H 61/32; F16H 2057/02082; F16H 2061/2876;
(Continued)

(56) References Cited

U.S. PATENT DOCUMENTS 2,755,081 A * 7/1956 Johnson .................. E05F 15/67
160/188
4,921,288 A * 5/1990 Cifuentes ................ E05B 81/25
292/114
(Continued)

FOREIGN PATENT DOCUMENTS

CN 201902543 U 7/2011
CN 202165585 U 3/2012
(Continued)

OTHER PUBLICATIONS

English Translation and International Search Report for Application No. PCT/CN2019/079999 filed Mar. 28, 2019, dated May 29, 2019, 6 pages.
(Continued)

*Primary Examiner* — Victor L MacArthur
(74) *Attorney, Agent, or Firm* — Brooks Kushman P.C.

(57) ABSTRACT

A shift drive including an actuating mechanism, a rack, and a gear housing. The actuating mechanism is driven by a driving mechanism. The rack is linked with the actuating mechanism. The rack includes a connection portion connected to the actuating mechanism through a connecting member 301 The gear housing is provided with an induction gear that meshes with the rack. The gear housing includes a track slot includes a take-up release section and a straight rail section, and an end portion of the rack is capable of a recoverable deformation that can slide in or out of the take-up release section and the length of projection of the take-up release section on an extension line in the direction
(Continued)

of the length of the straight rail section is less than the length of the track thereof.

20 Claims, 5 Drawing Sheets (51) Int. Cl.
*F16H 57/02* (2012.01)
*F16H 61/32* (2006.01)
*F16H 61/28* (2006.01)

(52) U.S. Cl.
CPC ............ *F16H 2057/02082* (2013.01); *F16H 2061/2876* (2013.01); *F16H 2061/2884* (2013.01); *F16H 2063/3059* (2013.01); *F16H 2063/3063* (2013.01)

(58) Field of Classification Search
CPC ..... F16H 2061/2884; F16H 2063/3059; F16H 2063/3063; F16H 63/30
See application file for complete search history.

(56) References Cited

U.S. PATENT DOCUMENTS

| | | | |
|---|---|---|---|
| 6,875,146 B2 | 4/2005 | Bansbach et al. | |
| 10,137,785 B2 | 11/2018 | Vahle et al. | |
| 2012/0024091 A1* | 2/2012 | Kawabuchi | B25J 18/06 74/37 |

FOREIGN PATENT DOCUMENTS

| | | | | |
|---|---|---|---|---|
| CN | 203047187 U | * | 7/2013 | |
| CN | 205136570 U | | 4/2016 | |
| CN | 106838303 A | | 6/2017 | |
| CN | 108302198 A | | 7/2018 | |
| CN | 208057921 U | | 11/2018 | |
| WO | WO-9413917 A1 | * | 6/1994 | ............ E05F 15/67 |
| WO | 2015139879 A1 | | 9/2015 | |
| WO | 2017170306 A1 | | 10/2017 | |

OTHER PUBLICATIONS

Supplementary European Search Report for Application No. EP19777417 filed Mar. 28, 2019, dated Nov. 3, 2021, 11 pages.

* cited by examiner

SHIFT DRIVE

CROSS-REFERENCE TO RELATED APPLICATION

This application is the U.S. national phase of PCT Application No. PCT/CN2019/079999 filed on Mar. 28, 2019 which claims priority to Chinese Patent Application 201810295940.6, filed on Mar. 30, 2018, and entitled "Shift Drive", the entire contents of which are incorporated herein by reference.

TECHNICAL FIELD

The present invention relates to the technical field of gearbox shifting, and in particular to a shift drive.

BACKGROUND

The description in this portion provides only background information related to the disclosure of the present invention and does not constitute prior art.

In the prior art, an electronic gearbox adapted to an electronic shift driver (SBW, Shift By Wire) is capable of receiving a shift signal transmitted from the SBW, thereby performing a shift operation.

For example, the publication No. CN205136570U, Electronic Shift Driver for Automobiles, provides the applicant with a known embodiment consistent with the above description. In the known embodiment, after receiving a shift signal from a central control unit (TCU, Transmission Control Unit), a motor drives a driving wheel to rotate, and the driving wheel drives a screw to rotate via a belt and a driven wheel, so that a slider set on the screw moves axially. A bulge disposed on the slider can push against a rack to move it in a track, and then turn a magnetic gear to rotate. Rotation of the magnetic gear will produce a magnetic field change, so that a Hall sensor senses the magnetic field change to realize the gear identification information. The TCU adjusts the motor speed according to the gear identification information, and moves a push rod connected to the slider to a designated position, thereby completing the shift.

Since a P gear used for parking requires a mechanical means to lock a rotating part of an automobile, such electronic gearbox only needs to be driven by an external driving force supplied by the SBW when it is handed over to the P gear, and handover to R, N, and D gears can be performed by receiving shift signals supplied by the SBW.

That is, the electronic shift driver including the above-described known embodiment provided by the present applicant can provide the electronic gearbox with the driving external force for performing the handover to the P gear, but cannot provide the external force for performing handover to R, N, and D gears. Thus, this type of electronic shift driver is applicable only to electronic gearboxes capable of receiving R-gear, N-gear, and D-gear signals, and cannot be expanded to automatic gearboxes of which other technologies are already mature. This limits the popularity of the electronic shift driver and makes it being not applicable to automatic gearboxes that are intended to maintain the existing configuration without technical reconstruction, but are intended to achieve the same shifting function as electronic shifters.

It should be noted that, the above introduction to the background is merely for the convenience of clear and complete description of the technical solution of the present invention, and for the convenience of understanding of persons skilled in the art. It cannot be regarded that the above technical solution is commonly known to persons skilled in the art just because that the solution has been set forth in the background of the present invention.

SUMMARY OF THE INVENTION

An electronic shift driver as described in the above known embodiment, which is only suitable for providing a gearbox with an external force for performing handover to the P gear, has a short stroke (generally about 17 mm) for its protrusion. the stroke of the protrusion will be greatly extended if it is intended to provide an automatic gearbox having existing known construction with an external force for performing handover to all gears including P, R, N and D gears.

However, due to the limited assembly space provided for the electronic shift driver, an attempt to achieve the above by lengthening the length of the track on the basis of the original structure will obviously increase the volume of the entire electronic shift driver, and such attempt needs to design different track lengths for different gearboxes, and cannot realize the modularization of the product.

Based on the aforementioned drawbacks of the prior art, embodiments of the present invention provide a shift drive which can be applicable to an automatic gearbox of the existing known construction, such that the shift drive can achieve the same shifting function as an electronic shifter without technical retrofitting.

In order to achieve the above object, the present invention provides the following technical solution.

A shift drive, comprising:

an actuating mechanism capable of being driven by a driving mechanism, the actuating mechanism being for connection to a gearbox;

a rack linked with the actuating mechanism, at least one end of the rack being capable of a recoverable deformation, the rack including a connection portion, the connection portion being connected to the actuating mechanism through a connecting member;

a gear housing provided with an induction gear that meshes with the rack, the gear housing having a track slot that receives the rack therein, the track slot having a straight rail section and a take-up release section, wherein an end portion of the rack that is capable of a recoverable deformation can slide in or out of the take-up release section, and the length of projection of the take-up release section on an extension line in the direction of the length of the straight rail section is less than the length of the track thereof.

Preferably, the gear housing is provided with the take-up release section on at least one side of the straight rail section.

Preferably, the straight rail section is located below the induction gear, and the take-up release section is disposed at at least one end of the straight rail section.

Preferably, both ends of the straight rail section are bent upward and downward, respectively, to form two take-up release sections which are located in the same plane as the straight rail section.

Preferably, the connection portion is provided thereon with a rigid holding portion, and the connecting member is a protrusion extending from the rigid holding portion toward the actuating mechanism and inserted into a connecting hole provided in the actuating mechanism.

Preferably, the length of the straight rail section is set such that the connection portion can only slide freely therein along with the actuating mechanism.

Preferably, the rack is provided with a plurality of longitudinally spaced notches at least on a side wall near the end portion of the rack that is capable of a recoverable deformation, so that the end portion of the rack that is capable of a recoverable deformation is bent in a drag-reducing manner to enter the take-up release section.

Preferably, the gear housing is provided thereon with a gear cover adapted thereto, and the gear cover is provided thereon with an elongated opening of which the connecting member extends out.

Preferably, the driving mechanism comprises a motor, the gear housing is provided with a magnetic field sensing element at a position corresponding to the induction gear, and the magnetic field sensing element and the motor are in signal connection to a central control unit of an automobile.

In the shift drive of the embodiment of the present invention, by providing in the gear housing a take-up release section having a length projected on the extension line in the length direction of the straight rail section that is less than the length of the track thereof, the end portion of the rack being received in the track slot, that is capable of a recoverable deformation, can slide in or out of the take-up release section, so as to greatly extend the stroke of the rack under the premise of occupying the same space, so as to meet the requirement that the shift drive is applicable to the automatic gearbox which requires the rack has a long stroke. In this way, the shift drive according to the embodiment of the present invention can be applied to an automatic gearbox of an existing known construction without technical retrofitting, and can achieve the same shifting function as an electronic shifter.

Moreover, by changing the degree of bending, that is, the curvature, of the take-up release section, it is possible to obtain different lengths of the track slot without changing the straight rail section, so as to meet the needs of different gearboxes for varying track lengths, such that the shift drive according to the embodiment of the present invention has better versatility and it is easy to realize the modularization of the product.

Specific embodiment of the invention is disclosed in detail with reference to the following description and the accompanying drawings, indicating the manner in which the principles of the invention may be employed. It should be understood that the embodiment of the present invention is not thus limited in scope. The embodiment of the present invention includes many variations, modifications and equivalents within the scope of the spirit and clause of the appended claims.

The features described and/or shown for one embodiment can be used in one or more other embodiments in the same or similar manner, can be combined with the features in other embodiments or replace the features in other embodiments.

It should be emphasized that, the term "include/comprise" refers to, when being used in the text, existence of features, parts, steps or assemblies, without exclusion of existence or attachment of one or more other features, parts, steps or assemblies.

BRIEF DESCRIPTION OF THE DRAWINGS

The drawings described herein are for purposes of explanation only and are not intended to limit the scope of disclosure of the present invention in any way. In addition, the shapes, proportional dimensions and the like of the components in the drawings are merely schematic, and are used to help the understanding of the present invention, but not intended to specifically limit the shapes and proportional dimensions of the components of the present invention. Those skilled in the art, subject to the teachings of the present invention, may select various possible shapes and proportional dimensions to practice the present invention as appropriate. In the drawings.

DETAILED DESCRIPTION OF THE PREFERRED EMBODIMENT

In order to make those skilled in the art better understand the technical solutions in the present invention, the technical solutions in the embodiments of the present invention will be clearly and completely described in the following with reference to the accompanying drawings in the embodiments of the present application. Obviously, the described embodiments are only a part of the embodiments of the present invention, but not all of them. Based on the embodiments of the present invention, all other embodiments that are obtained by persons skilled in the art without making creative efforts shall fall within the protection scope of the present invention.

It should be noted that when an element is referred to as being "disposed" on another element, it may be directly on another element or there may also be an intervening element. When one element is considered to be "connected" to another element, it may be connected directly to another element or there may be an intervening element as well. The terms "vertical," "horizontal," "left," "right" and other similar expressions used herein are used for illustrative purposes only and are not meant to be the only embodiment.

Unless otherwise defined, all technical and scientific terms used herein have the same meanings as that are generally understood by those skilled in the art belonging to the technical field of the present invention. The terms used herein in the description of the invention are for purposes of describing specific embodiments only and are not intended to limit the invention. The terms "and/or" as used herein include any and all combinations of one or more related listed items.

Figure 1:
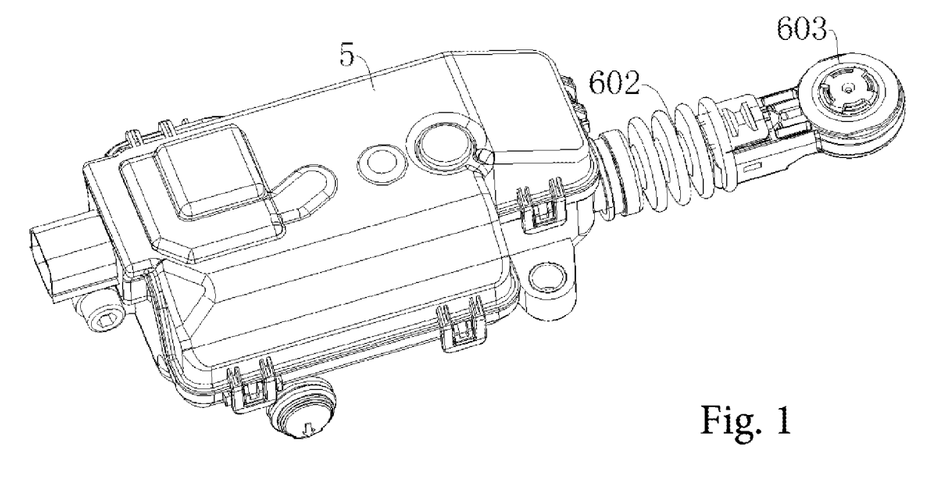
FIG. 1 is a perspective view of a shift drive according to an embodiment of the present invention.
Figure 2:
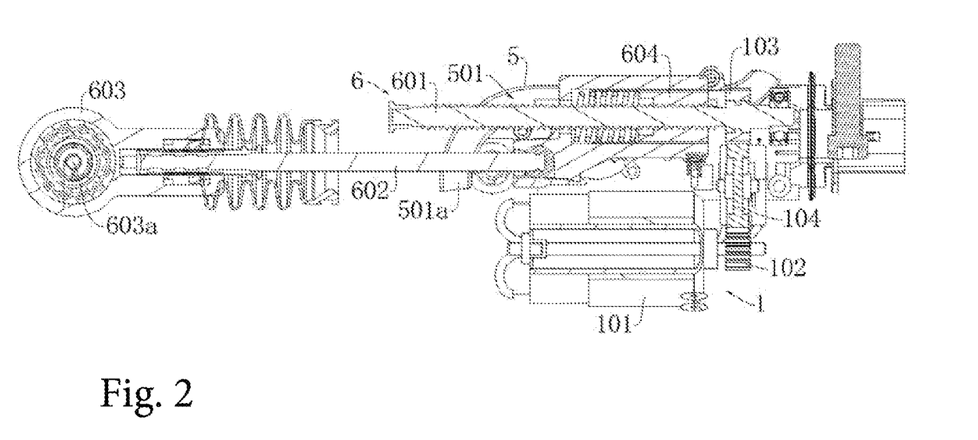
FIG. 2 is a sectional view of a shift drive according to an embodiment of the present invention.
Figure 3:
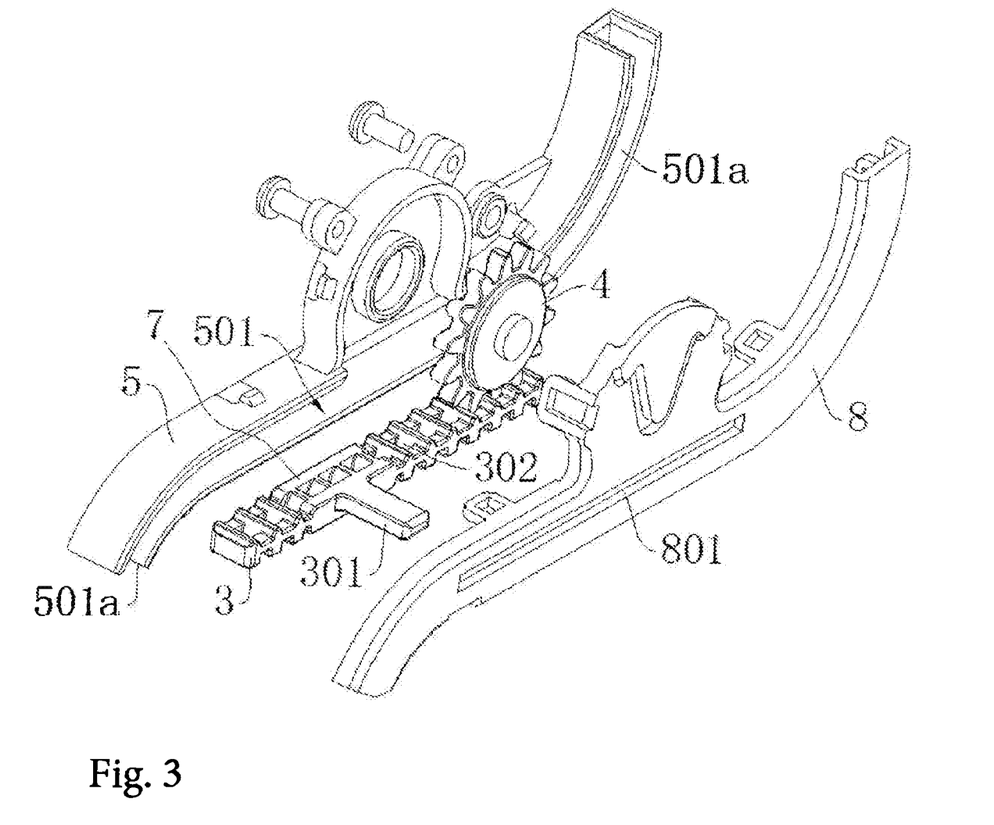
FIG. 3 is an exploded perspective schematic view of a gear housing, a gear cover, an induction gear and a rack in the shift drive according to an embodiment of the present invention.
Figure 4:
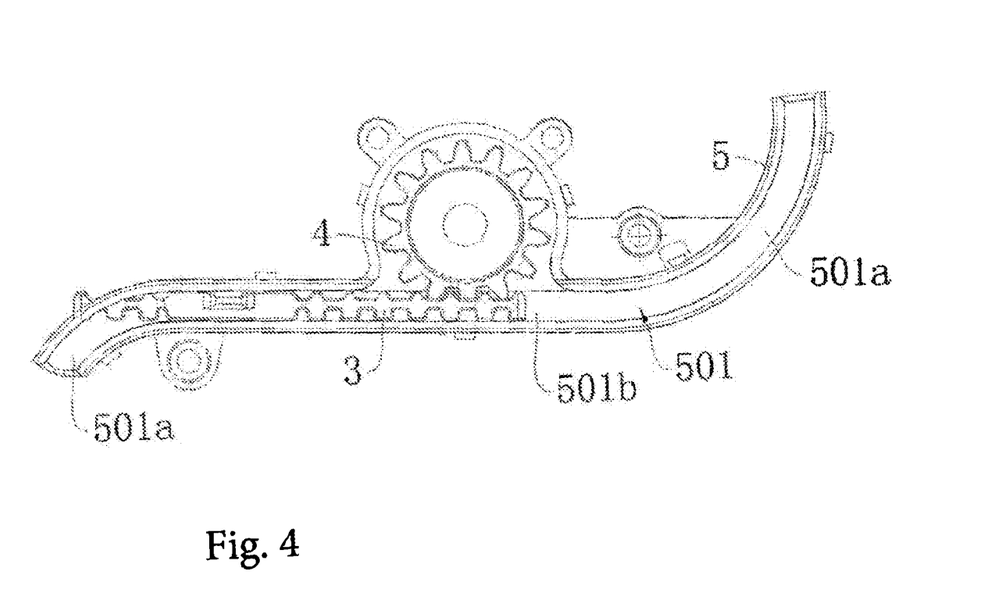
FIG. 4 is an assembly sectional view of a gear housing with an induction gear and a rack in the shift drive according to an embodiment of the present invention.

As shown in FIGS. 1 to 4, the embodiment of the present invention provides a shift drive which may comprise: an actuating mechanism 6 capable of being driven by a driving mechanism 1, the actuating mechanism 6 being for connection to a gearbox (not shown); a rack 3 linked with the actuating mechanism 6, at least one end of the rack 3 being capable of a recoverable deformation, the rack 3 including a connection portion, the connection portion being connected to the actuating mechanism 6 through a connecting member 301; a gear housing 4 provided with an induction gear 4 that meshes with the rack 3, the gear housing 5 having a track slot 501 for a track that receives the rack 3 therein, the track slot 501 having a take-up release section 501a and a straight rail section 501b, wherein an end portion of the rack 3 that is capable of a recoverable deformation can slide in or out of the take-up release section 501a, and the length of projection (the downward projection as shown in FIG. 3) of the take-up release section 501a on an extension line in the direction of the length of the straight rail section 501b is less than the length of the track slot 501. The track slot 501 including the take-up release section 501a and the straight rail section 501b.

In the shift drive of the embodiment of the present invention, by providing in the gear housing 5 a take-up release section 501a having a length projected on the extension line in the length direction of the straight rail section 501b that is less than the length of the track slot 501, the end portion of the rack 3 being received in the track slot 501, that is capable of a recoverable deformation, can slide in or out of the take-up release section 501a, so as to greatly extend the stroke of the rack 3 under the premise of occupying the same space, so as to meet the requirement that the shift drive is applicable to the automatic gearbox which requires the rack 3 has a long stroke. In this way, the shift drive according to the embodiment of the present invention can be applied to an automatic gearbox of an existing known construction without technical retrofitting, and can achieve the same shifting function as an electronic shifter.

Moreover, by changing the degree of bending, that is, the curvature, of the take-up release section 501a, it is possible to obtain different lengths of the track slot 501 without changing the straight rail section 501b, so as to meet the needs of different gearboxes for varying track slot lengths, such that the shift drive according to the embodiment of the present invention has better versatility and it is easy to realize the modularization of the product.

As shown in FIGS. 1 and 2, the actuating mechanism 6 may comprise a screw 601 which is externally sleeved with a slider 604 connected with a push rod 602 by a universal joint structure, the other end of the push rod 602 is connected to a socket shell 603 having a ball socket 603a, and the socket shell 603 is connected to a shift arm of the gearbox through the ball socket 603a.

The driving mechanism 1 may comprise a motor 101, which may drive the screw 601 to rotate. The specific driving mode may be the belt drive provided by the above-mentioned known embodiment, and details thereof are disclosed in the present invention by way of reference, and are not repeated herein.

Alternatively, a gear drive manner may be adopted. Specifically, an output shaft of the motor 101 is provided with a driving gear 102, and the end of the screw 601 is provided with a driven gear 103, the driving gear 102 may be directly meshed with the driven gear 103 to realize drive connection, or may be meshed with the driven gear 103 through an idle gear 104 to realize indirect drive.

The connecting member 301 may be connected to the slider 604 or the push rod 602 so as to be connected to the actuating mechanism 6. Specifically, the slider 604 or the push rod 602 is provided with a connecting hole adapted to the connecting member, and the connecting member 301 is inserted into the connecting hole.

The rack 3 is substantially in the form of a flat strip having at least one end portion capable of a recoverable deformation (i.e., deformation not exceeding an elastic limit so that it can rebound to the original state), and the end portion is arranged corresponding to the take-up release section 501a such that at least the end portion of the rack 3 can adapt to the curvature change of the take-up release section 501a and thus enter the take-up release section 501a.

Preferably, the rack 3 as a whole may have the performance of a recoverable deformation. Thus, the rack 3 is made of a flexible elastic material such as thermoplastic polyurethane elastomer rubber (TPU), so that the rack 3 can be deformed in any direction such that the rack 3 as a whole can be adaptively deformed in accordance with the shape of the track slot 501, so as to slide in or out of the take-up release section 501a, to meet the requirement that the shift drive is applicable to the automatic gearbox which requires the rack 3 has a long stroke.

When the end portion of the rack 3 that is capable of a recoverable deformation enters the take-up release section 501a, it may be radially bent such that the inner side of the rack 3 (the upper end as illustrated in FIG. 3) is compressed. This compression causes the rack 3 to have a tendency to rebound radially outward, thereby exerting a force on the inner wall of the take-up release section 501a, thus increasing the frictional force between the rack 3 and the inner wall of the take-up release section 501a, causing the rack 3 to be hindered from sliding.

To this end, as shown in FIG. 3, the rack 3 is provided with a plurality of longitudinally spaced notches 302 at least on a side wall near the end portion of the rack that is capable of a recoverable deformation, the plurality of notches 302 may provide the rack 3 with a space for radial deformation upon entry into the take-up release section 501a, to reduce or even prevent the inner side of the rack 3 from being compressed, thereby reducing the frictional force between the rack 3 and the inner wall of the take-up release section 501a, ensuring that the end portion of the rack 3 that is capable of a recoverable deformation is bent in a drag-reducing manner to enter the take-up release section 501a, thereby ensuring that the rack 3 can slide smoothly.

The gear housing 5 may be provided with a take-up release section 501a on at least one side of the straight rail section 501b, that is, there may be at least one take-up release section 501a. Specifically, the straight rail section 501b is located below the induction gear 4, and the take-up release section 501a is disposed at at least one end of the straight rail section 501b. Moreover, it is preferable that the take-up release section 501a is communicated with the straight rail section 501b in a smooth transition so as to reduce the occurrence of blocking and unsmooth sliding of the rack 3 at the connection between the two sections.

Further, the take-up release sections 501a are preferably two, and specifically the two take-up release sections 501a may be formed by bending two ends of the straight rail section 501b upward and downward, respectively, so that the space size of the gear housing 5 can be fully utilized to increase the stroke of the rack 3 as much as possible.

The two take-up release sections 501a and the straight rail section 501b are preferably located in the same plane so that the rack 3 can slide in or out of the take-up release sections 501a in a distortion-free manner, thereby maintaining the smoothness of sliding of the rack 3.

Furthermore, with the two take-up release sections 501a and the straight rail section 501b being located in the same plane, the space in the vertical direction of the gear housing 5 can be fully utilized without increasing the space size in the direction perpendicular to the straight rail section 501b, so that the compact structure is ensured while the dimensional structure design is optimized, and thus the structure of the gear housing 5 tends to be miniaturized.

The projection of the straight rail section 501b on a projection plane perpendicular to a horizontal plane (which is a reference when the shift drive according to the embodiment of the present invention is actually used, and herein the horizontal plane is a plane perpendicular to a paper surface) is a straight line profile, which is in smooth transition to the take-up release sections 501a.

Figure 5A:
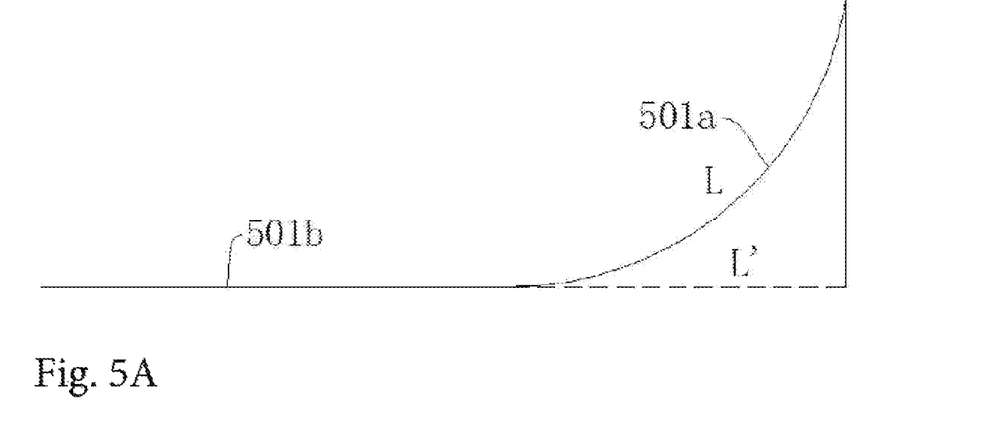
FIG. 5A is a schematic diagram of connection between a straight rail section and a take-up release section according to a first preferred embodiment of the present invention.

Specifically, as shown in FIG. 5A, the projection of the take-up release section 501a (since it lies in the same plane as the straight rail section 501b) on the projection plane described above is a circular arc profile, and the straight rail section 501b and the take-up release sections 501a are connected in a tangential manner at the junction.

Figure 5B:
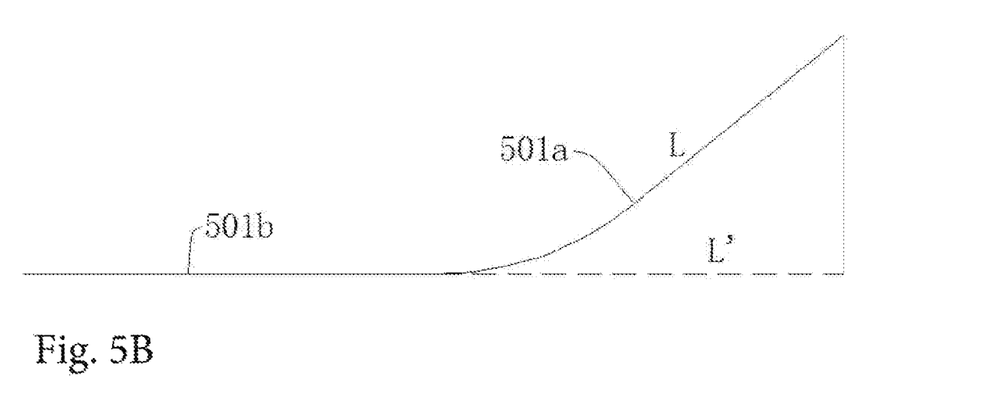
FIG. 5B is a schematic diagram of connection between a straight rail section and a take-up release section according to a second preferred embodiment of the present invention.

Alternatively, as shown in FIG. 5B, the projections of the take-up release sections 501a on the projection plane described above are a circular arc profile and a straight line profile, the circular arc profile being tangent to the straight rail section 501b and the straight line profile.

Figure 5C:
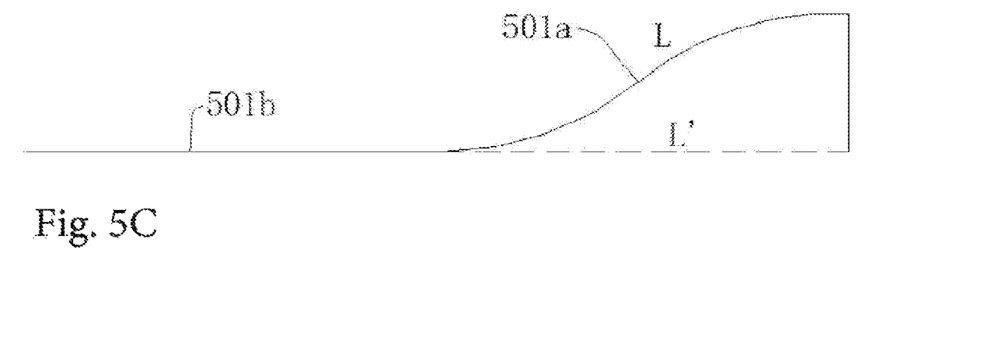
FIG. 5C is a schematic diagram of connection between a straight rail section and a take-up release section according to a third preferred embodiment of the present invention.

Alternatively, as shown in FIG. 5C, the projections of the take-up release sections 501a on the projection plane described above are two circular arc profiles, the circular arc profile in the middle being tangent to the straight rail section 501b and the other circular arc profile.

Of course, the above is merely an illustrative embodiment, and other possible profiles may be included in practice, and will not be exemplified herein.

Further referring to FIGS. 5A to 5C, since the take-up release sections 501a and the straight rail section 501b are located on the same plane, the take-up release sections 501a can be line projected on the extension line in the longitudinal direction of the straight rail section 501b. Then, the length of the take-up release sections 501a projected on the extension line in the length direction of the straight rail section 501b (the length of the dashed lines in FIGS. 5A to 5C) is L', and the length of the track slot 501 (actually the circumference thereof) is L, wherein L' <L.

Alternatively, the take-up release sections 501a may also be projected on the projection plane defined by the straight rail section 501b. Specifically, upper and lower surfaces of the straight rail section 501b, or the horizontal surface when the shift drive according to the embodiment of the present invention is actually used, may be used as the projection surface. The projection length of the take-up release section 501a on such projection surface also satisfies the requirement of being less than the length of the track slot 501.

In this embodiment, the connection portion is a part of the structure of the rack 3 itself, which may be a portion of the rack 3 that is close to the middle, or a portion where the rack 3 is connected to the connecting member 301 may be defined as the connection portion.

Alternatively, the length of the straight rail section 501b is set such that the connection portion can slide freely only therein along with the actuating mechanism 6. Therefore, a portion of the rack 3 that moves only in the straight rail section 501b and does not enter the take-up release section 501a may also be defined as the connection portion.

Following the description above, since the connection portion is connected to the driving mechanism 6 through the connecting member 301, the driving mechanism 6 drives the connection portion to move through the connecting member 301, thereby driving the rack 3 to move in the track slot 501.

In general, realization of the function of the electronic shifter requires a high degree of transmission between the mechanical components, and requires synchronous transmission between the linkage components, that is, rigid transmission is required. Otherwise, the final measurement error is likely to be caused, resulting in shift misalignment.

Specifically, in the present invention, when a shift signal triggers the motor 101 to rotate, motor 101 is at a high speed and drives the actuating mechanism 6 from being stationary to move at a very high speed, resulting in a great acceleration. The driving mechanism 6 also converts this acceleration into an acting force applied to the connecting member 301, which further applies the acting force to the rack 3. Thus this causes the connecting member 301 and the rack 3 to be subjected to a great acting force, and the connecting member 301 may be deformed. Likewise, since the rack 3 is made of a flexible elastic material, it is also possible for the rack 3 to be bent and deformed radially or stacked at a portion corresponding to the connecting member 301. In this way, the transmission ratio between the rack 3 and the driving mechanism 6 would be affected, causing the axial movement of the push rod 602 to be out of synchronization with the rotation of the induction gear 4 turned by the rack 3, finally resulting in the measurement error of the magnetic field sensing element.

In order to avoid the above circumstance as much as possible, the connecting member 301 can be connected to the connection portion of the rack 3 through a rigid holding portion 7. The rigid holding portion 7 is preferably attached to the rack 3 in a covering manner (the covering portion is the connection portion) so as to increase the connection strength between the two, and has a thickness greater than that of the rack 3 so as to have a better rigidity.

The connecting member 301 is preferably formed integrally with the rigid holding portion 7, and specifically may be formed as a protrusion extending from the rigid holding portion 7 toward the actuating mechanism 6 and inserted into a connecting hole provided in the actuating mechanism 6. In this way, the connecting member 301 and the rigid holding portion 7 have the same thickness that is larger than the thickness of the rack 3, thereby forming an increased thickness portion, and ensuring that the connecting member 301 has a rigidity that enables the rack 3 and the actuating mechanism 6 to be driven synchronously.

When the connecting member 301 is quickly driven by the actuating mechanism 6, the connection portion covered by the rigid holding portion 7 and a rack section adjacent to the connection portion will not be bent and deformed or not be stacked, thereby ensuring better measurement accuracy.

Furthermore, to ensure the measurement accuracy, the rack 3 is required to slide in or out of the take-up release section 501a smoothly. From the above, it can be seen that in the present invention, the end portion of the rack 3 corresponding to the take-up release section 501a can smoothly enter the take-up release section 501a without stacking and blocking in such a manner that the rack 3 is made of a flexible elastic material so as to have better deformation performance.

However, if the rack 3 has better deformation performance, it will accordingly result in that the connection of the rack 3 with the connecting member 301 is not able to provide sufficient rigidity when it is driven rapidly by the actuating mechanism 6.

That is, for the purpose of the measurement accuracy, the rack 3 is required to have better deformation performance, and the part thereof corresponding to the connection portion has better rigidity, both of which are diametrically opposed or even contradictory.

Therefore, how to maintain better rigidity at the part of the rack 3 corresponding to the connecting member 301 and at the same time making other parts of the rack 3, especially the end portions, have better deformation capability are two contradictory technical problems.

In the present invention, by providing the rigid holding portion 7 on the connection portion of the rack 3 made of a flexible elastic material and combining the notches 302 provided on the rack 3, the above-mentioned contradictory technical problems can be better solved.

The rack 3 made of a flexible elastic material in combination with the notch 302 provided thereon may enable the rack 3 to have better deformation performance at least at the end thereof, so that the rack 3 can be bent in a drag-reducing manner and enter the take-up release section 501a smoothly. The connection portion of the rack 3 is connected to the connecting member 301 through the rigid holding portion 7, so that the rack 3 has better rigidity at a portion corresponding to the connection portion, to realize its synchronous transmission with the actuating mechanism 6.

Further, the length of the straight rail section 501 is set such that the rigid holding portion 7 is limited to slide only within the straight rail section 501b, that is, the rigid holding portion 7 moves linearly only within the straight rail section 501b of the track slot 501 and does not enter the take-up release section 501a of the track slot 501. In this way, it is ensured that the connecting member 301 and the rigid holding portion 7 will not be radially deformed and bent during sliding of the rack 3 within the straight rail section 501b.

As shown in FIG. 3, the gear housing 5 may be provided thereon with a gear cover 8 adapted thereto. Similarly, the gear cover 8 is also provided with the same slot structure as the track slot 501, and the two slots form an inner space in which the rack 3 is accommodated after the gear housing 5 and the gear cover 8 are combined, so that the sliding of the rack 3 can be limited.

Further, the gear cover 8 is provided thereon with an elongated opening 801 of which the connecting member 301 extends out and which is corresponding to the straight rail section 501b of the track slot 501, the connecting member 301 passes through the elongated opening 801 to be connected to the actuating mechanism 6.

The specific principle of operation of the shift drive according to the embodiment of the present invention is that the gear housing 5 is provided with a magnetic field sensing element (which may be for example, a Hall sensor) connected to the TCU by signal at a position thereof corresponding to the induction gear 4. The motor 101 rotates after it receives the shift signal generated by the TCU in signal connection to the motor 101 based on the user's triggering operation, to drive the screw 601 to rotate, and the slider 604 sleeving outside the screw 601 and engaged with the screw 601 is axially moved, and the slider 604 pushes the push rod 602 to move, thereby driving the connecting member 301 inserted into the connecting hole of the slider 604 or the push rod 602 to move, then the connecting member 301 causes the rack 3 to slide in the track slot 501, so that the rack 3 turns the induction gear 4 to rotate by being engaged with the induction gear 4. Rotation of the induction gear 4 will produce a magnetic field change, so that the magnetic field sensing element senses the magnetic field change to realize the gear identification information. The TCU adjusts the rotational speed of the motor 101 or stops the motor 101 according to the gear identification information, moves the push rod 602 connected to the slider 604 to a designated position, and shifts the gear.

Since the shift drive according to the embodiment of the present invention extends the stroke of the rack 3, it is possible not only to apply a shift driving force to the gearbox by the actuating mechanism 6 after a P gear signal is received, but also to apply the shift driving force to the gearbox after R, N, and D gear signals are received, such that it is possible to realize electronic shifting in a gearbox that doesn't have a capacity of receiving R, N, and D gear signals.

It should be understood that the above description is for purposes of illustration and not for purposes of limitation. Many embodiments and many applications other than the examples provided will be apparent to those skilled in the art from reading the above description. Accordingly, the scope of the present teachings should not be determined with reference to the above description, but should be determined with reference to the foregoing claims and the full scope of equivalents owned by these claims. The disclosure of all articles and references, including patent applications and publications, is incorporated herein by reference for purposes of completeness. The omission of any aspect of the subject matter disclosed herein in the foregoing claims is not intended to waive the subject matter and the applicant should not be deemed to have not considered the subject matter as a part of the disclosed subject matter.

The invention claimed is:

1. A shift drive comprising:
    an actuating mechanism capable of being driven by a driving mechanism;
    a rack linked with the actuating mechanism, at least one end of the rack being capable of a recoverable deformation, the rack including a connection portion and the connection portion being connected to the actuating mechanism through a connecting member; and
    a gear housing including a track slot that receives the rack therein, the track slot includes a straight rail section and a take-up release section, wherein an end portion of the rack is capable of a recoverable deformation that slides in or out of the take-up release section,
    wherein the take-up release section includes a first curved end being positioned at a first end of the straight rail section of the track slot and a second curved end being positioned at a second end of the straight rail section of the track slot, and
    wherein a length of the straight rail section is set such that the connection portion can only slide freely therein along with the actuating mechanism.

2. The shift drive of claim 1, wherein both ends of the straight rail section are bent upward and downward, respectively, to form two take-up release sections which are located in the same plane as the straight rail section.

3. The shift drive of claim 1, wherein the connection portion is provided with a rigid holding portion thereon, and the connecting member is a protrusion extending from the rigid holding portion toward the actuating mechanism and inserted into a connecting hole provided in the actuating mechanism.

4. The shift drive of claim 1, wherein the rack is provided with a plurality of longitudinally spaced notches at least on a side wall near the end portion of the rack that is capable of the recoverable deformation, so that the end portion of the rack that is capable of the recoverable deformation is bent in a drag-reducing manner to enter the take-up release section.

5. The shift drive of claim 1, wherein the gear housing is provided thereon with a gear cover adapted thereto, and the gear cover is provided thereon with an elongated opening of which the connecting member extends out.

6. The shift drive of claim 1, wherein the driving mechanism comprises a motor, the gear housing is provided with a magnetic field sensing element at a position corresponding to an induction gear, and the magnetic field sensing element and the motor are in signal connection to a central control unit of an automobile.

7. The shift drive of claim 1, wherein the actuating mechanism is connected to a gearbox.

8. The shift drive of claim 1 further comprising a gear housing provided with an induction gear that meshes with the rack.

9. A shift drive comprising:
an actuating mechanism capable of being driven by a driving mechanism;
a rack linked with the actuating mechanism, at least one end of the rack being capable of a recoverable deformation, the rack including a connection portion and the connection portion being connected to the actuating mechanism through a connecting member; and
a gear housing including a track slot that receives the rack therein, the track slot includes a straight rail section and a take-up release section, wherein an end portion of the rack is capable of a recoverable deformation that slides in or out of the take-up release section,
wherein the take-up release section includes a first curved end being positioned at a first end of the straight rail section of the track slot and a second curved end being positioned at a second end of the straight rail section of the track slot, and
wherein the gear housing is provided thereon with a gear cover adapted thereto, and the gear cover is provided thereon with an elongated opening of which the connecting member extends out.

10. The shift drive of claim 9, wherein the actuating mechanism is connected to a gearbox.

11. The shift drive of claim 9 further comprising a gear housing provided with an induction gear that meshes with the rack.

12. The shift drive of claim 9, wherein the driving mechanism comprises a motor, the gear housing is provided with a magnetic field sensing element at a position corresponding to an induction gear, and the magnetic field sensing element and the motor are in signal connection to a central control unit of an automobile.

13. The shift drive of claim 9, wherein both ends of the straight rail section are bent upward and downward, respectively, to form two take-up release sections which are located in the same plane as the straight rail section.

14. The shift drive of claim 9, wherein the connection portion is provided with a rigid holding portion thereon, and the connecting member is a protrusion extending from the rigid holding portion toward the actuating mechanism and inserted into a connecting hole provided in the actuating mechanism.

15. The shift drive of claim 9, wherein the rack is provided with a plurality of longitudinally spaced notches at least on a side wall near the end portion of the rack that is capable of the recoverable deformation, so that the end portion of the rack that is capable of the recoverable deformation is bent in a drag-reducing manner to enter the take-up release section.

16. A shift drive comprising:
an actuating mechanism capable of being driven by a driving mechanism;
a rack linked with the actuating mechanism, at least one end of the rack being capable of a recoverable deformation, the rack including a connection portion and the connection portion being connected to the actuating mechanism through a connecting member; and
a gear housing including a track slot that receives the rack therein, the track slot includes a straight rail section and a take-up release section, wherein an end portion of the rack is capable of a recoverable deformation that slides in or out of the take-up release section,
wherein the take-up release section includes a first curved end being positioned at a first end of the straight rail section of the track slot and a second curved end being positioned at a second end of the straight rail section of the track slot, and
wherein the driving mechanism comprises a motor, the gear housing is provided with a magnetic field sensing element at a position corresponding to an induction gear, and the magnetic field sensing element and the motor are in signal connection to a central control unit of an automobile.

17. The shift drive of claim 16, wherein the actuating mechanism is connected to a gearbox and the shift drive further comprising a gear housing provided with an induction gear that meshes with the rack.

18. The shift drive of claim 16, wherein both ends of the straight rail section are bent upward and downward, respectively, to form two take-up release sections which are located in the same plane as the straight rail section.

19. The shift drive of claim 16, wherein the connection portion is provided with a rigid holding portion thereon, and the connecting member is a protrusion extending from the rigid holding portion toward the actuating mechanism and inserted into a connecting hole provided in the actuating mechanism.

20. The shift drive of claim 16, wherein the rack is provided with a plurality of longitudinally spaced notches at least on a side wall near the end portion of the rack that is capable of the recoverable deformation, so that the end portion of the rack that is capable of the recoverable deformation is bent in a drag-reducing manner to enter the take-up release section.

* * * * *